US009942390B2

(12) United States Patent
Pearce

(10) Patent No.: US 9,942,390 B2
(45) Date of Patent: Apr. 10, 2018

(54) INTERNET PROTOCOL TELEPHONY WITH VARIABLE-LENGTH CARRIER SYSTEMS

(71) Applicant: Cisco Technology, Inc., San Jose, CA (US)

(72) Inventor: Christopher Pearce, Dallas, TX (US)

(73) Assignee: Cisco Technology, Inc., San Jose, CA (US)

(*) Notice: Subject to any disclaimer, the term of this patent is extended or adjusted under 35 U.S.C. 154(b) by 103 days.

(21) Appl. No.: 14/949,283

(22) Filed: Nov. 23, 2015

(65) Prior Publication Data
US 2017/0149965 A1    May 25, 2017

(51) Int. Cl.
H04M 3/42    (2006.01)
H04M 7/00    (2006.01)
H04W 8/18    (2009.01)
H04L 29/06   (2006.01)

(52) U.S. Cl.
CPC .... H04M 3/42059 (2013.01); H04L 65/1069 (2013.01); H04M 7/0036 (2013.01); H04M 7/0057 (2013.01); H04M 7/0075 (2013.01); H04W 8/18 (2013.01)

(58) Field of Classification Search
CPC ................................................ H04M 3/42059
See application file for complete search history.

(56) References Cited

U.S. PATENT DOCUMENTS

| 6,301,353 | B1  |    | 10/2001 | MacIsaac et al. |
| 7,123,608 | B1  | *  | 10/2006 | Scott ................... H04M 3/2218 370/353 |
| 7,188,110 | B1  | *  | 3/2007  | Ludtke ................ G06Q 20/341 382/115 |
| 7,864,939 | B1  | *  | 1/2011  | Burg .................. H04M 3/42382 379/205.01 |

(Continued)

OTHER PUBLICATIONS

P. Jones, et al., "End-to-End Session Identification in IP-Based Multimedia Communication Networks", draft-ietf-insipid-session-id-16, Network Working Group, Internet Draft, Oct. 19, 2015, 33 pages.

(Continued)

Primary Examiner — Hassan Kizou
Assistant Examiner — Ashil Farahmand
(74) Attorney, Agent, or Firm — Edell, Shapiro & Finnan, LLC

(57) ABSTRACT

First call identification information is stored at a network-connected device. The first call identification information identifies a call between an initiating device connected to an Internet Protocol (IP)-based network and a called device connected to the IP-based network. The call identified by the first call identification information is established through a telephone carrier network. Second call identification information is stored in the network-connected device. A determination is made that the first call identification information and the second call identification information identify the call from the initiating device to the called device. The call (Continued)

is connected through the IP-based network so as to avoid the telephone carrier network based upon the determining that the first call identification information and the second call identification information identify the call.

19 Claims, 8 Drawing Sheets

(56) References Cited

U.S. PATENT DOCUMENTS

| | | | |
|---|---|---|---|
| 7,881,446 B1 * | 2/2011 | Apple | H04M 15/08 379/114.21 |
| 8,898,219 B2 | 11/2014 | Ricci | |
| 2006/0256773 A1 * | 11/2006 | Hume | H04L 29/06027 370/352 |
| 2008/0037430 A1 | 2/2008 | Wah et al. | |
| 2009/0080411 A1 | 3/2009 | Lyman | |
| 2009/0274040 A1 | 11/2009 | Karacali-Akyamac et al. | |
| 2011/0038471 A1 | 2/2011 | Gopalakrishna | |

OTHER PUBLICATIONS

Extended European Search Report in corresponding European Application No. 16199616.0, dated Mar. 24, 2017, 6 pages.

Jones et al., "End-to-End Session Identification in IP-Based Multimedia Communication Networks", Internet Engineering Task Force Internet Draft, Jul. 31, 2011, 8 pages.

Mahy et al., "The Session Initiation Protocol (SIP) "Replaces" Header", Internet Engineering Task Force RFC 3891, Sep. 2004, 14 pages.

* cited by examiner

US 9,942,390 B2

INTERNET PROTOCOL TELEPHONY WITH VARIABLE-LENGTH CARRIER SYSTEMS

TECHNICAL FIELD

The present disclosure relates to network packet-based telephony.

BACKGROUND

In cloud-based telephone systems, when one customer of a cloud-based service calls another customer of the service, the cloud-based service can provide features above and beyond those provided by traditional carriers, e.g., video calls. The cloud-based system can provide these services by extending the call from the caller to the called party strictly through the Internet Protocol (IP) network, bypassing the carrier network. Calls placed to called parties outside of the cloud-based system may be incapable of receiving these additional services as carrier systems may not be configured to handle the traffic formats required to provide the services and/or are incapable of meeting the bandwidth requirements for the additional services.

In variable-length numbering carrier systems, knowledge of the route plan through the network is distributed throughout the entire carrier network. These dial plans are very complex. There may be codes for province/state, city, neighborhood, class of number, or even enterprise extension. As a result, such systems extend calls via the staged collection of digits, otherwise known as overlap signaling. Such systems are prevalent in Europe, and countries such as Germany in particular. Variable-length numbering carrier systems present challenges for cloud-based telephone systems.

DESCRIPTION OF EXAMPLE EMBODIMENTS

Overview

First call identification information is stored at a network-connected device. The first call identification information identifies a call between an initiating device connected to an Internet Protocol (IP)-based network and a called device connected to the IP-based network. The call identified by the first call identification information is established through a telephone carrier network. Second call identification information is stored in the network-connected device. A determination is made that the first call identification information and the second call identification information identify the call from the initiating device to the called device. The call is connected through the IP-based network so as to avoid the telephone carrier network based upon the determination that the first call identification information and the second call identification information identify the call.

EXAMPLE EMBODIMENTS

Figure 1:
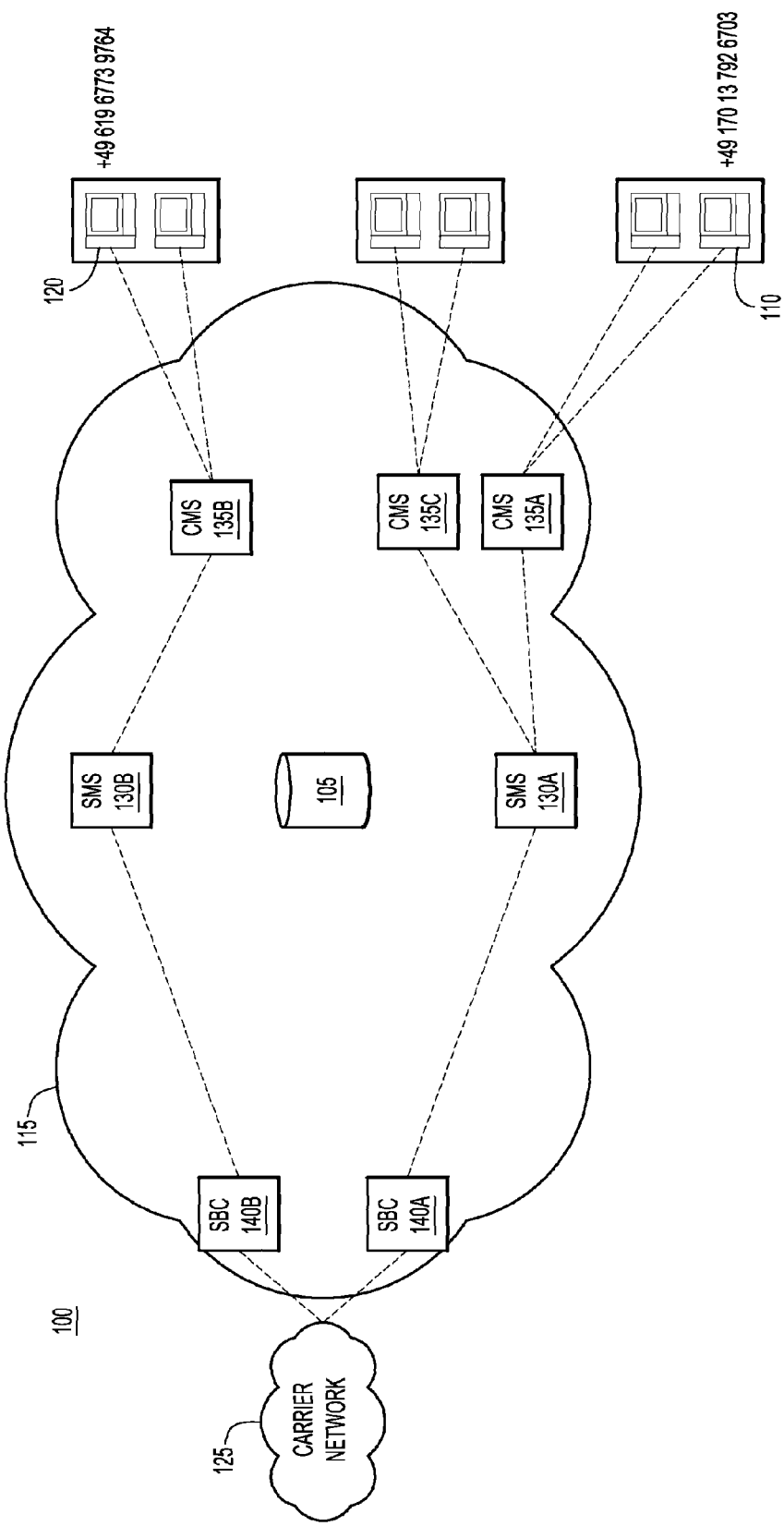
FIG. 1 is block diagram showing a network environment configured to provide internet protocol-based telephony with variable-length carrier systems, according to an example embodiment.

With reference made to FIG. 1, depicted therein is a cloud environment 100 configured to provide packet network-based telephone call services in a variable length numbering plan environment. Specifically, through the use of data store 105, it may be determined when calls originate from a device 110 accessing cloud environment 115 to connect to a called device 120, also accessing cloud environment 115. Data store 105 may be a shared data store to which call agents can commit data and from which all call agents can read data. Data store 105 may be a relational database, though other types of data stores such as a distributed key-value stores may also be used. While network 100 is illustrated as a cloud-based network, it may also be embodied in other types of Internet Protocol (IP)-based networks. For example, a local business may establish IP telephony services for an organization, or a local office through a local or private network that does not utilize a cloud-based network. The techniques described herein are also applicable to such local or private networks.

Also illustrated in FIG. 1 is carrier network 125. Carrier network 125 is a variable length numbering system network. In a variable length numbering system, knowledge of the route plan through the telecommunication system is distributed throughout the telecommunication system. The variable length phone numbers may include codes for province/state, city, neighborhood, class of number, and/or enterprise extension. As a result, such systems extend calls via the staged collection of digits, known as overlap signaling. According to one specific example, a telephone device located in Germany may dial:

0 619 6773 9764

The "0" steers the call towards the carrier system and into carrier network 125. The carrier network then reads the "6196" which steers the call towards a particular area such as the Rhine. The "773" may be a particular exchange in that area, and the "9764" may be a particular subscriber number.

The source system, represented in FIG. 1 by cloud environment 115 (e.g., a cloud-based system) is unaware that the "6196" steers the call towards the Rhine, is unaware that the "773" is a particular exchange in the Rhine, and is unaware that the "9764" is a particular subscriber. Instead, cloud environment 115 knows from the receipt of the "0" to steer the call towards carrier network 125. Carrier network 125 subsequently requests additional digits. As the digits arrive (i.e., as the "6," "1," "9," "6," etc. arrive) the carrier network 125 determines that the call does not terminate locally and selects a neighboring switch to handle the call. As numbers are not of any fixed length, it is not feasible for an originating switch to collect the full digit string before steering the call forward, as for example, dialing a "5" versus a "6" at some point in the digit string may necessitate collecting an additional four digits instead of an additional three digits. Therefore, even though carrier network 125 may ultimately steer the call back into cloud environment 115 towards device 120, the logic of the variable length numbering plan environment sends the call out of cloud environment 115 for routing. Because carrier network 125 may not support packet network-based services, such as video, cloud environment 115 will be unable to support these packet network-based services even though both of devices 110 and 120 are connected to cloud environment 115.

By implementing data store 105, it may be determined when a call that is sent out to carrier network 125 from cloud environment 115 is returned to carrier network 115 when routing the call to the destination device. As will be illustrated in more detail below, when a call is sent through cloud environment 115, information identifying the call may be stored in data store 105 by one or more of session management systems (SMSs) 130*a* and 130*b*, call management systems (CMSs) 135*a* and 135*b* and/or session border controllers (SBCs) 140*a* and 140*b*. As described in detail below, information identifying the call is stored in data store 105 from both the initiating device 110 and the called device 120. Accordingly, if there are matching entries in data store 105, it can be determined that the call initiated by device 110 was calling device 120. This allows one or more of SMSs 130*a* and 130*b*, CMSs 135*a* and 135*b* and/or SBCs 140*a* and 140*b* to circumvent the carrier network 125, keeping the traffic associated with the call within cloud environment 115. In other words, one or more of SMSs 130*a* and 130*b*, CMSs 135*a* and 135*b* and/or SBCs 140*a* and 140*b* "short circuits" the network path between device 110 and device 120 so that the call path remains inside of cloud environment 115. Once "short circuited," packet network-based services, such as video, may be applied to the call.

Figure 2:
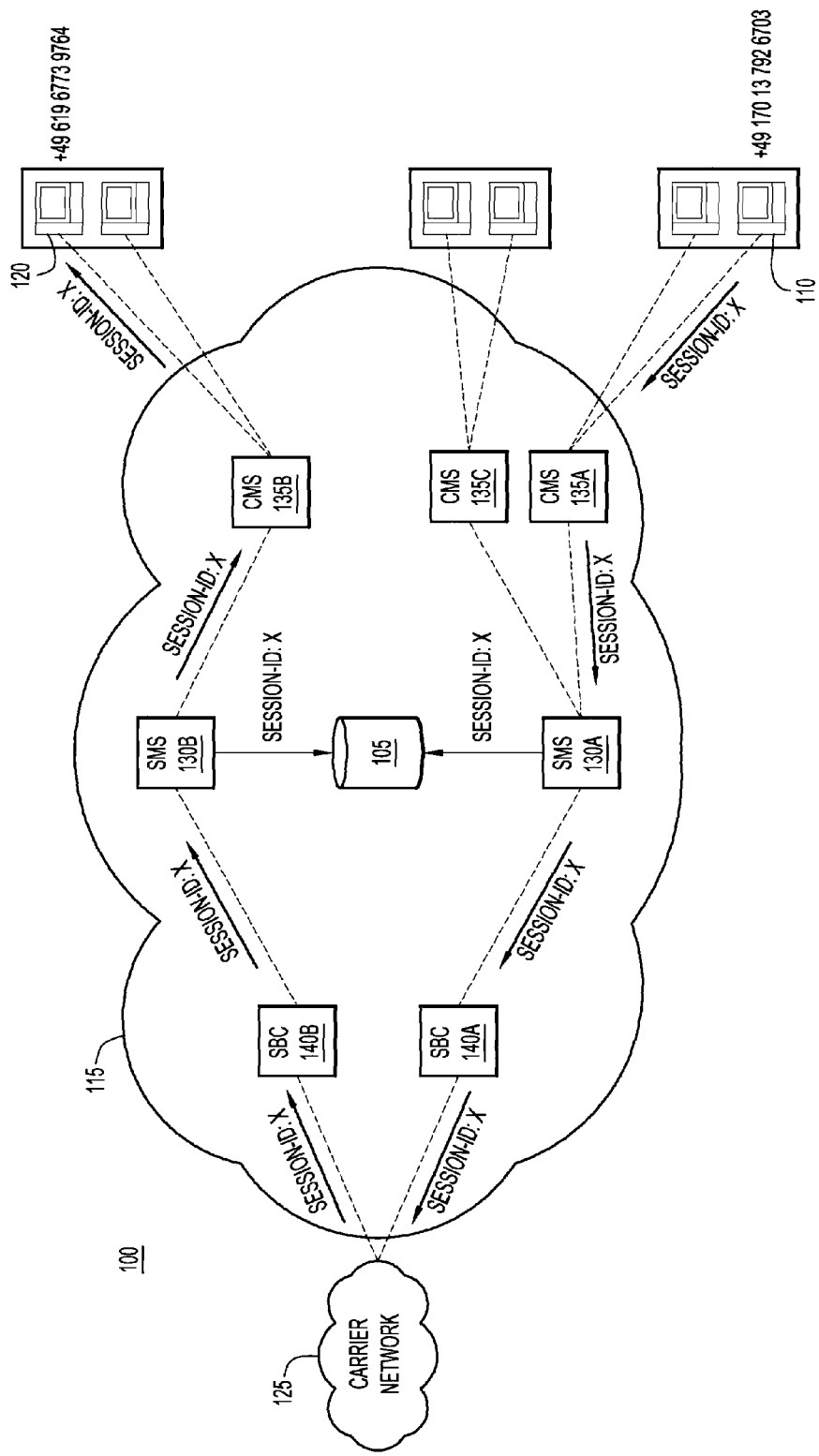
FIG. 2 illustrates a first use of a data store to provide internet protocol-based telephony with variable-length carrier systems, according to an example embodiment.

With reference now made to FIG. 2, depicted therein is the establishment of a call between initiating device 110 and called device 120 in which a session identifier (ID) is passed along with the messages used to establish the call between initiating device 110 and called device 120. The session ID illustrated in FIG. 2 may be embodied as an end-to-end Session Identifier for use in IP-based multimedia communication systems that enables endpoints, intermediary devices, and management systems to identify a session end-to-end, associate multiple endpoints with a given multipoint conference, track communication sessions when they are redirected, and associate one or more media flows with a given communication session. Specifically, the session ID may be a session ID as described in the Internet Engineering Task Force (IETF) draft entitled "End-to-End Session Identification in IP-Based Multimedia Communication Networks." Such a session ID is a two-part key that can define the end-to-end connection between initiating device 110 and called device 120. For example, the session ID may be a combination of the number being dialed and a dialog ID. According to the specific example embodiment of the IETF draft referenced above, the initiating device 110 communicates a half-key with the messages used to establish the call with the called device 120. Assuming end-to-end transparency, the called device 120 also communicates its half-key. The half-key from the called device 120 propagates back towards the initiating device 110 along the same path used to establish the call from the initiating device 110. Therefore, each intermediate call agent between the initiating device 110 and the called device 120 receives each of the half-keys.

As described above, the message establishing the call traverses CMS 135*a*, SMS 130*a* and SBC 140*a*, exiting the cloud environment 115 and entering the carrier network 125. In the present example, carrier network 125 also carries the session ID value, so this value continues to be forwarded through SBC 140*b*, SMS 130*b* and CMS 135*d*, and ultimately reaching called device 120. The call between initiating device 110 and called device 120 may then stabilize.

As some point during the initiation of the call, some identifying call information will be committed to data store 105 by a network device associated with initiating device 110 and also by a network device associated with called device 120. According to the example embodiment of FIG. 2, once the call stabilizes, the origination call agent (i.e., SMS 130*a*, the call agent servicing initiating device 110) and the termination call agent (i.e., SMS 130*b*, the call agent servicing called device 120) commit some information to the shared data store 105. This information may include the origination and termination session-ID universal unique identifiers (UUIDs) and/or the calling and connected party information. The information may also include call agent identifiers and the corresponding dialog IDs for the egress and ingress legs of the call. As illustrated in FIG. 2, SMS 130*a* sends the session-ID to the data store 105, as does SMS 130*b*. While the session-IDs are committed to the data store 105 in FIG. 2 after the call has stabilized, other example embodiments may commit the information to data store 105 at other times. For example, the information may be committed to data store 105 upon receipt by the originating call agent (e.g., SMS 130*a*) and/or upon receipt at the terminating call agent (e.g., SMS 130*b*).

Once the information is committed to data store 105, one or more of the call agents, in this case one or more of SMSs 130*a* and 130*b*, may consult data store 105 to determine whether or not the initiating device 110 and called device 120 are both serviced by cloud environment 115. Specifically, if there are two records present in data store 105 that share the same identifying information, in this case the same session ID, it may be determined that both the initiating device 110 and the called device 120 are serviced by cloud environment 115. Said differently, when two records sharing the same identification are included in data store 105, it means that the call agent servicing the initiating device as well as the call agent servicing the called device are both part of the same network environment. Accordingly, it may be determined that the call has "hairpinned." As used in the present disclosure, a call "hairpins" when the call leaves one network environment, enters a service provider for routing, and then returns to the same network environment. When a call hairpins, both the initiating call agent (i.e., SMS 130*a*) and the receiving call agent (i.e., SMS 130*b*) will both provide identifying information to data store 105.

On the other hand, a call that has not hairpinned will not have two entries in data store 105, but will instead have only a single entry. For example, if a call initiated by device 110 is routed through cloud environment 115, to carrier network 125, and then to another network environment not illustrated in FIG. 2, data store 105 will only have a single entry identifying that call as only the initiating call agent, e.g., SMS 130*a*, is present in cloud environment 115. Accordingly, when the call agent, e.g., SMS 130*a*, accesses data store 105 to determine if the call has hairpinned, only a single entry will be found. This will indicate that the call has not hairpinned, and no further action will be taken, other than the normal call processing.

Figure 3:
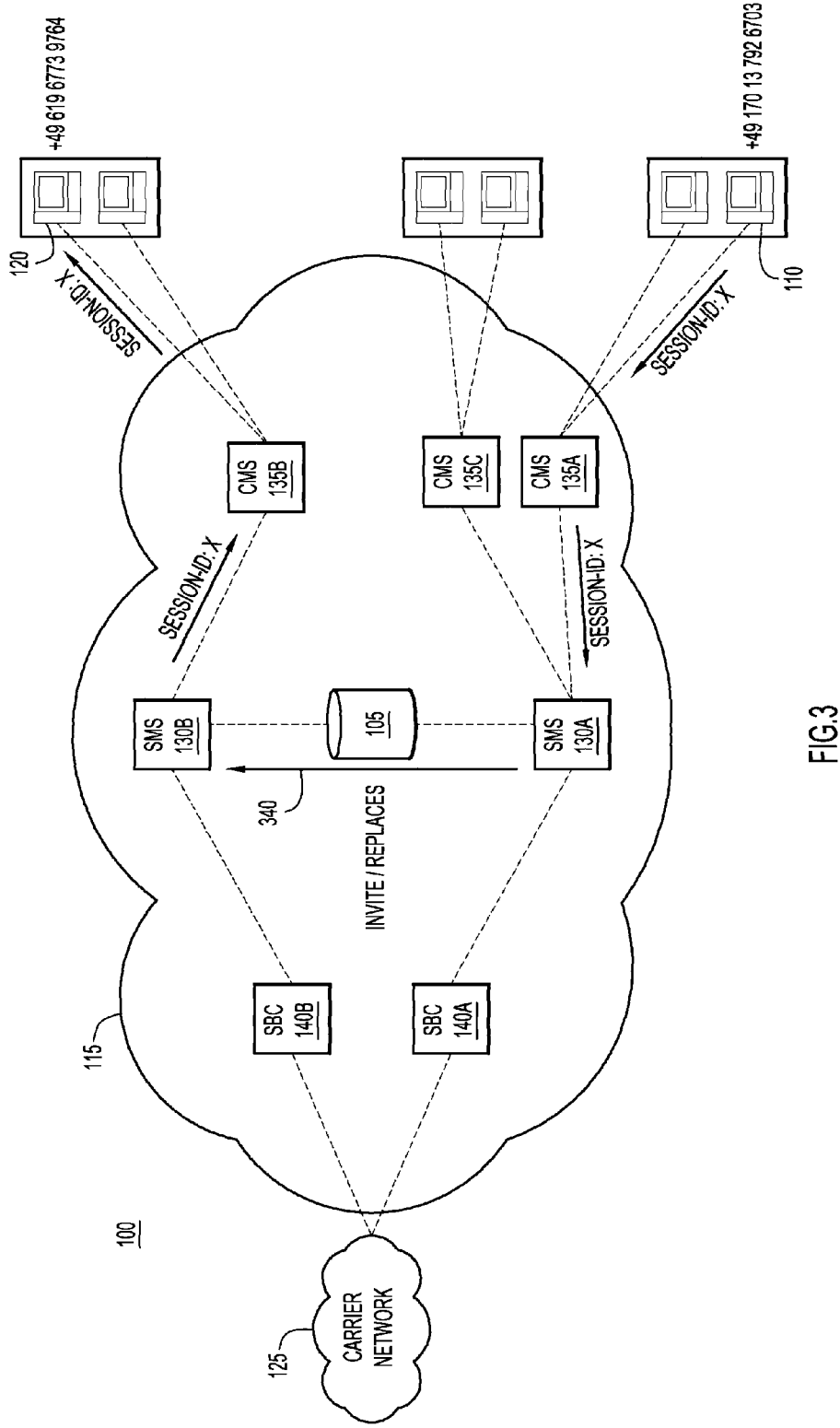
FIG. 3 illustrates short-circuiting the carrier system to provide internet protocol-based telephony with variable-length carrier systems, according to an example embodiment.

Returning to the example of a call that does hairpin with reference to FIG. 3, depicted therein are the subsequent processes performed to "short circuit" carrier network 125. In FIG. 3, once it is determined that there are two records in data store 105, and therefore that the call has hairpinned, one of SMS 130a or SMS 130b sends a message 340 to the other of SMS 130a or SMS 130b. This message indicates that the path between the initiating device 110 and the called device 120 should "short-circuit" the carrier network 125, and remain within cloud environment 115. In response to message 340, the path between initiating device 110 and called device 120 will be rerouted so that packets comprising the call will traverse CMS 135a, SMS 130a, SMS 130b and CMS 135b.

According to some example embodiments, message 340 may comprise an INVITE with Replaces as described in IETF Request for Comments (RFC) RFC3891. Such an "INVITE with Replaces" includes a dialog identifier and indicates that the present INVITE should replace the corresponding dialog ID managed by the other call agent. Accordingly, the dialog ID associated with the path traversing carrier network 125 will be replaced by the path short circuiting carrier network 125 traversing between SMS 130a and SMS 130b. In other words, if SMS 130b accepts message 340, SMS 130b associates the new inbound call leg with the existing call leg that it is managing and acknowledges the INVITE. Upon receiving the acknowledgement, SMS 130a attaches its outbound INVITE/Replaces call leg to the existing call. Therefore, SMS 130a and SMS 130b cause the hairpin through the carrier network 125 to be eliminated without affecting the end-to-end connection between initiating device 110 and called device 120.

Furthermore, because the call between initiating device 110 and called device 120 now remains within cloud environment 115, additional services, such as multimedia services, may be applied to the call between initiating device 110 and called device 120. For example, after a brief media renegotiation, initiating device 110 and called device 120 may converse via video. Other multimedia services, such as online collaborative session rostering and control channel messages may also be applied to the call.

Figure 4:
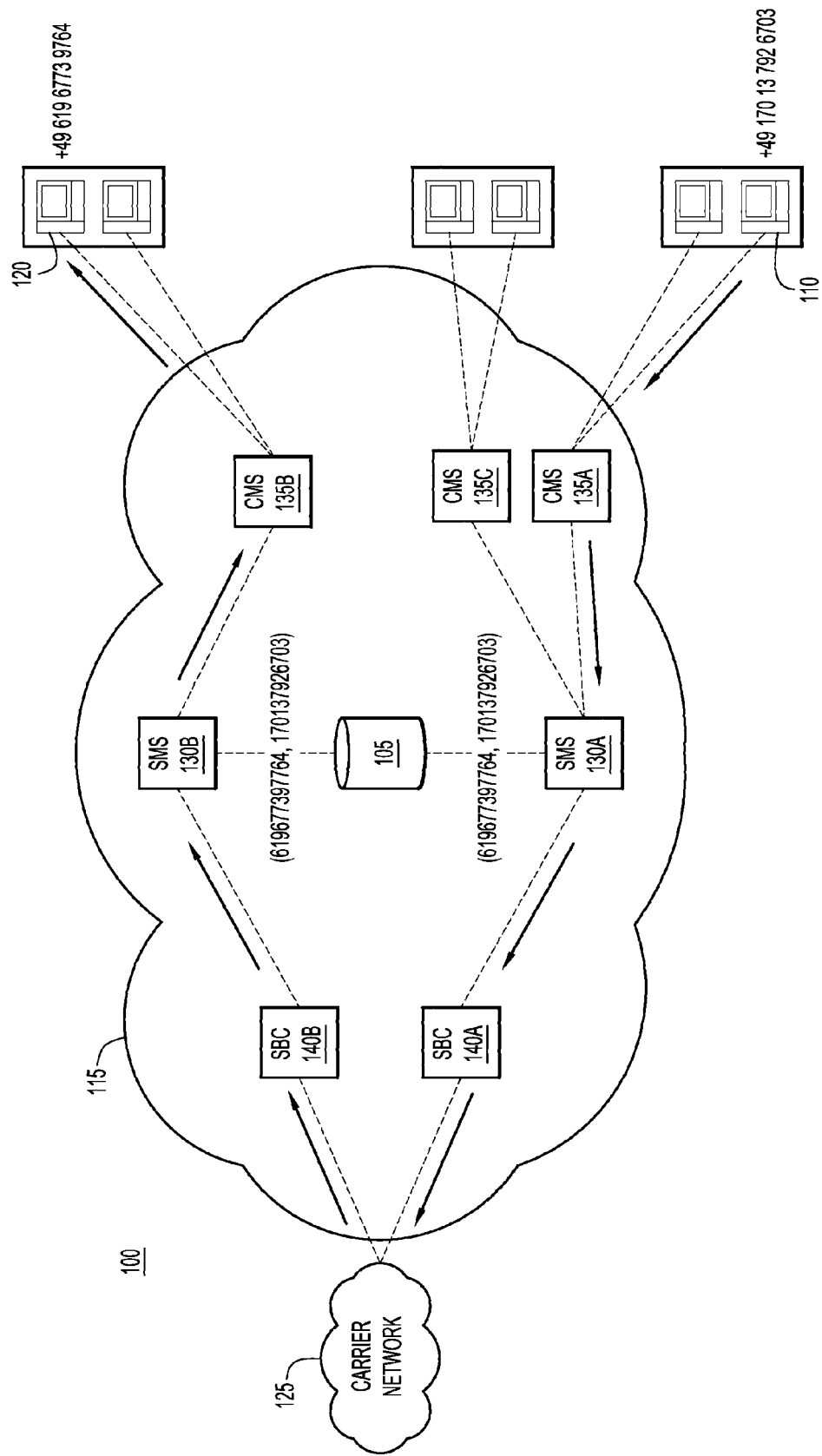
FIG. 4 illustrates a second use of a data store to provide internet protocol-based telephony with variable-length carrier systems, according to an example embodiment.

With reference now made to FIG. 4, depicted therein is another example embodiment in which a combination of caller information and called party information replaces the session ID illustrated in FIG. 2. This combination of caller and called party identifying information may be used when carrier network 125 is not configured to transmit and/or receive a session ID. According to one example, the caller and called party information may include the telephone number for the party placing the call, as well as the number for party who is being called. Because the identifying information is sent to data store 105 after the call is stabilized, the number for the called device 120 will be known even in a variable length call system.

Figure 5:
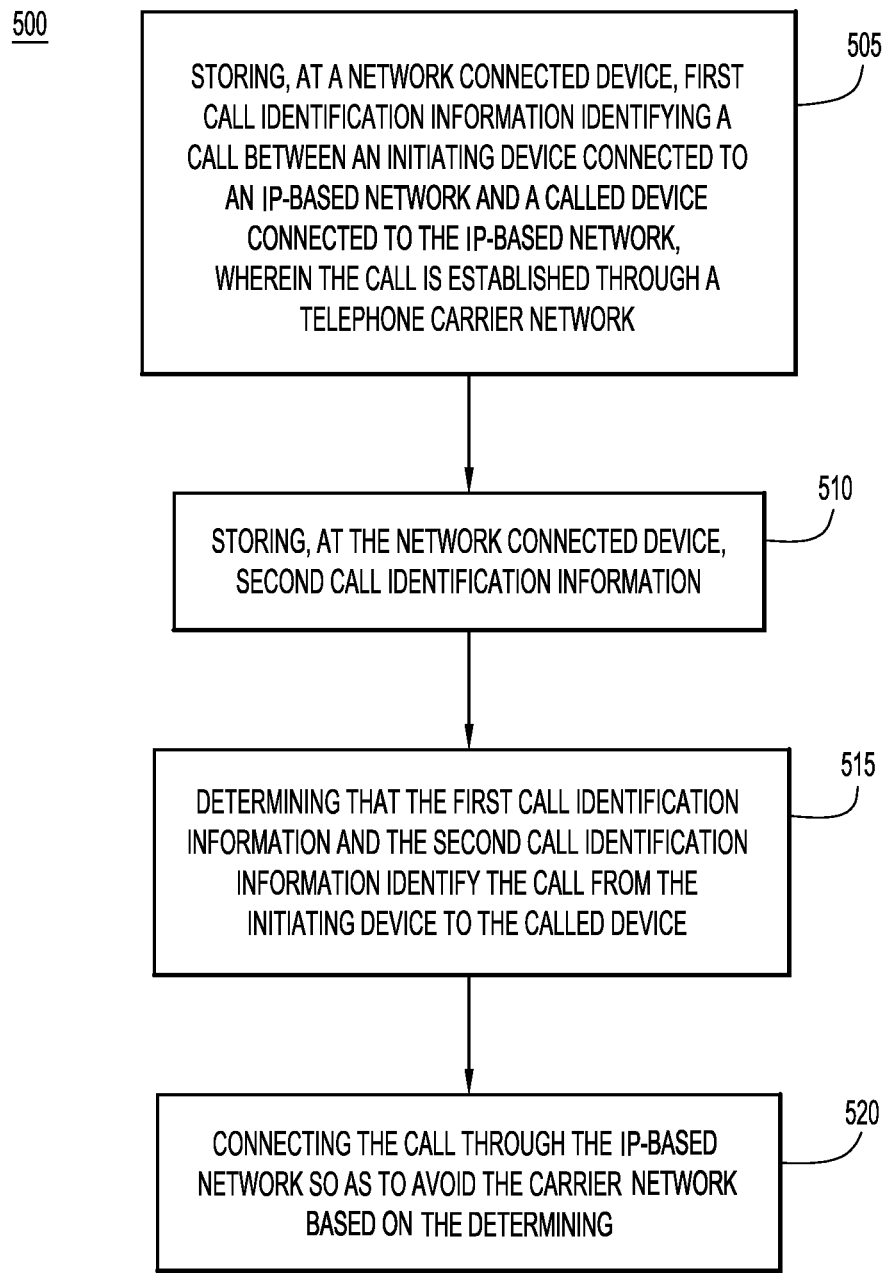
FIG. 5 is a flowchart illustrating a process for providing internet protocol-based telephony with variable-length carrier systems, according to an example embodiment.

With reference now made to FIG. 5, depicted therein is a flowchart 500 illustrating a process for carrying out the "short circuiting" of a carrier system hairpin, as described above in FIGS. 1-4. The process begins in operation 505 where first call information is stored at a network-connected device. The first call identification information is received from an initiating device, such as initiating device 110 of FIGS. 1-4, for a call between the initiating device and a called device, such as called device 120 of FIGS. 1-4. The call identification information may be stored in a shared data store, such as data store 105 of FIGS. 1-4. The network-connected device may comprise a call agent device, such as SMS 130a, a call management system device, such as CMS 130a, a session border controller such as SBC 140a, or a standalone network-connected device. The call is established through a carrier network, such as carrier network 125 of FIGS. 1-4. The first stored information may include a session ID, such as a session ID described in the IETF draft entitled "End-to-End Session Identification in IP-Based Multimedia Communication Networks," or it may be a combination of caller and called party identifying information. The first stored information may be stored in a data store in response to operations performed by a call agent, such as SMS 130a of FIGS. 1-4. The identification information may be generated by a call system agent (e.g. SMS 130a) or by the initiating device (e.g., initiating device 110).

In operation 510, second call identification information is stored at the network-connected device. The second stored information may include a session ID, or it may be a combination of caller and called party identifying information. The second stored information may be stored in a data store in response to operations performed by a call system agent, such as SMS 130b of FIGS. 1-4.

In operation 515, it is determined that the first call identification information and the second call identification information identify the call from the initiating device to the called device. For example, in operation 515 a call agent device, such as SMS 130a or SMS 130b, may access a data store in which the first and second call identification information are stored. If the call agent device determines that there are two entries with the same call identification information (i.e., if the first call identification information and the second call identification information match), it is determined that the first and second call identification information identify the same call. In other words, because both the initiating device and the called device are connected to the IP-based network (e.g., a cloud-based network), and the call was established through the carrier network, it is determined in operation 515 that the call has hairpinned.

In operation 520, the call is connected through the IP-based network so as to avoid the telephone carrier network, in response to the determination made in operation 515. In other words, the carrier network is circumvented by connecting the call through the IP-based network in response to the determination made in operation 515. The call is "short-circuited" through the IP-based network in response to the determination that the call hairpins back from the carrier network.

Figure 6:
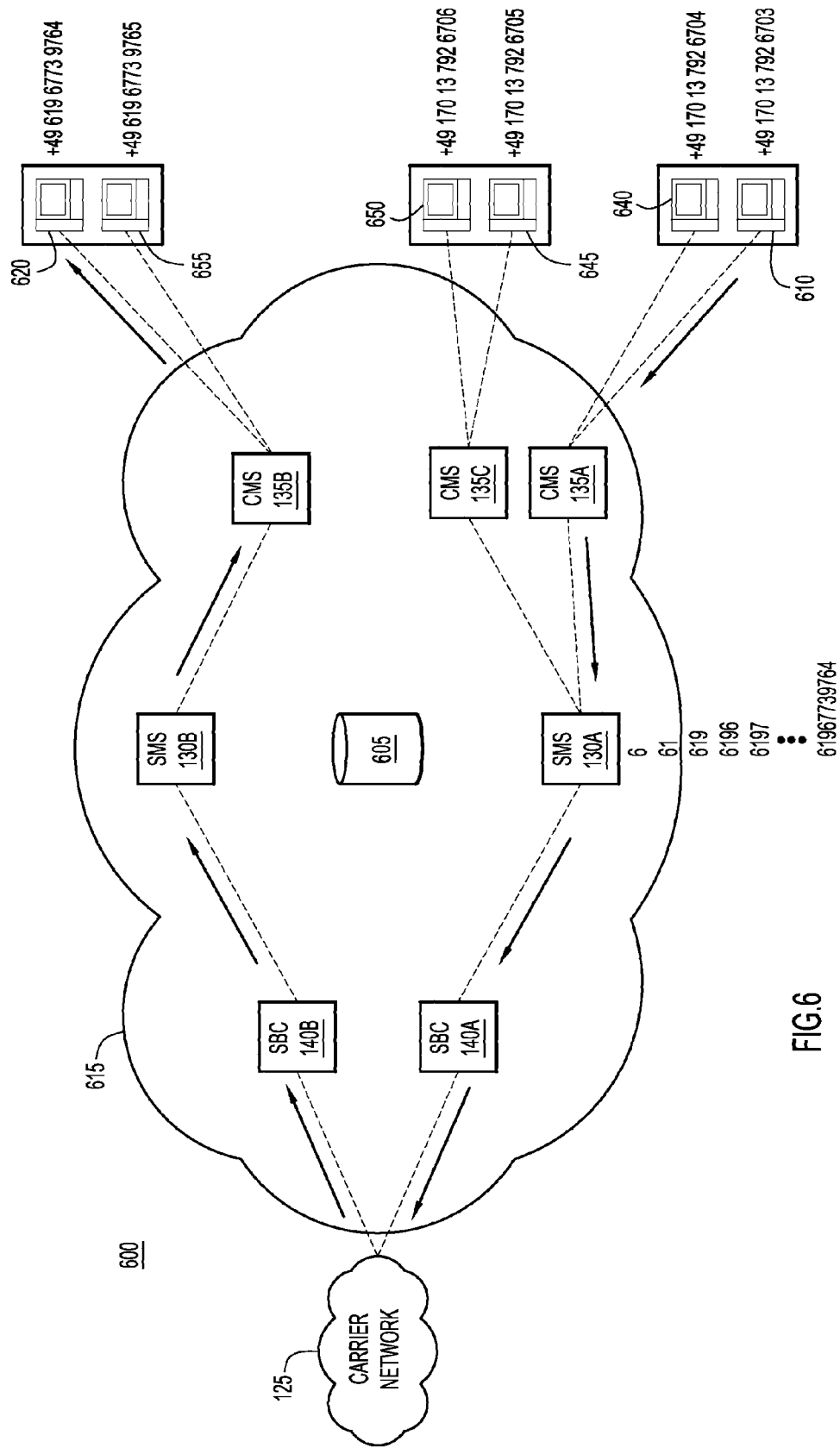
FIG. 6 illustrates a third use of a data store to provide internet protocol-based telephony with variable-length carrier systems, according to an example embodiment.
Figure 7:
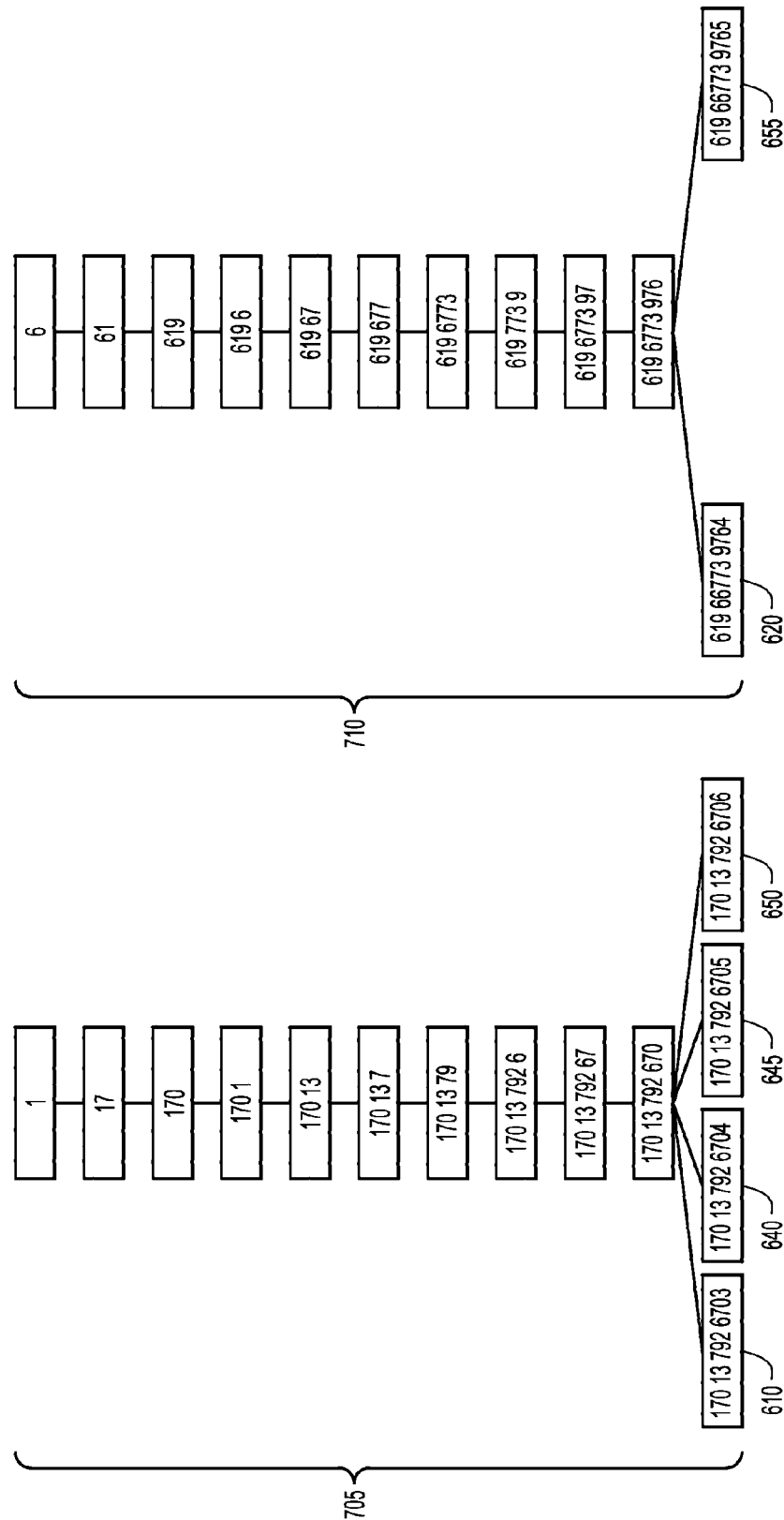
FIGS. 7A and 7B illustrate data structures for use in a data store to provide internet protocol-based telephony with variable-length carrier systems, according to an example embodiment.

With reference now made to FIG. 6, depicted therein is another example environment 600 for eliminating hairpinning in packet-based calling systems. System 600 is similar to system 100 of FIGS. 1-4 in that it contains a data store, in this case, data store 605. But unlike data store 105 of FIGS. 1-4, data store 605 contains more than call identification information. Instead, data store 605 includes a hierarchical structure of all valid numbers within cloud environment 615. Turning briefly to FIGS. 7A and 7B, depicted therein are hierarchal arrangements of data contained in a data store, such as data store 605. FIG. 7A illustrates a first tree structure 705 that contains data for all numbers that begin with a "1." Accordingly, tree structure 705 includes the data for the telephone numbers of devices 610, 640, 645 and 650, including every valid substring for the numbers associated with devices 610, 640, 645 and 650 of FIG. 6. For example, all of devices 610, 640, 645 and 650 of FIG. 6 have numbers that include the digits "170 13 792 670," differing only in their final digit. Accordingly, tree 705 includes branch values for each of the substrings that lead up to the numbers associated with devices 610, 640, 645 and 650, with leaf values for the full numbers associated with devices

610, 640, 645 and 650. Tree structure 710 of FIG. 7B includes similar values for devices 620 and 655 of FIG. 6.

According to other example embodiments, the strings may not be stored in a hierarchical structure. Instead, each valid substring will be stored along with an indication of how many valid telephone numbers or "descendants" are associated with that substring. If the string is the entire valid number, the string will be stored with an indication that the string is the final number that has no descendants. Accordingly, the data from FIG. 7A may also be stored as illustrated in Table 1.

TABLE 1

| | | |
|---|---|---|
| 1 | Non-final | 4 Descendants |
| 17 | Non-final | 4 Descendants |
| 170 | Non-final | 4 Descendants |
| 1701 | Non-final | 4 Descendants |
| 17013 | Non-final | 4 Descendants |
| 170137 | Non-final | 4 Descendants |
| 1701379 | Non-final | 4 Descendants |
| 17013792 | Non-final | 4 Descendants |
| 170137926 | Non-final | 4 Descendants |
| 1701379267 | Non-final | 4 Descendants |
| 17013792670 | Non-final | 4 Descendants |
| 170137926703 | Final | No Descendants |
| 170137926704 | Final | No Descendants |
| 170137926705 | Final | No Descendants |
| 170137926706 | Final | No Descendants |

When digits are provided to SMS 130a, instead of passing digits to carrier network 125, the SMS 130a consults data store 605. SMS 130a will compare the received numbers to the hierarchical data structures 705 and 710 illustrated in FIGS. 7A and 7B, respectively. If a branch entry is found (i.e., an entry other than the entries at the bottom of the trees), SMS 130a will continue to receive digits from the initiating device. If a leaf entry is found (i.e., the entries at the bottom of tree 705 of FIG. 7A and tree 710 of FIG. 7B, specifically, the entries for call devices 610, 620, 640, 645, 650 and 655) SMS 130a knows the number corresponds to a subscriber (i.e., one of call devices 610, 620, 640, 645, 650 and 655 which are included in cloud environment 615) and can offer the call directly through cloud environment 615. But if no entry is found, SMS 130a knows the number is a number outside of cloud environment 615, and therefore, the digits are passed to carrier network 125.

According to other example embodiments, the received numbers will be compared with data like that illustrated in Table 1. If a "Final" entry is found, SMS 130a knows the number corresponds to a subscriber (i.e., one of call devices 610, 620, 640, 645, 650 and 655 which are included in cloud environment 615) and can offer the call directly through cloud environment 615. But if no entry is found, SMS 130a knows the number is a number outside of cloud environment 615, and therefore, the digits are passed to carrier network 125.

In other words, system 600 bypasses the overlap signaling of carrier network 125, when appropriate, by placing every subscriber number and every substring of the subscriber numbers into data store 605. A call agent, such as SMS 103a, will only release a call to carrier network 125 if it can definitively determine that there is no subscriber with the dialed number within cloud environment 615.

Figure 8:
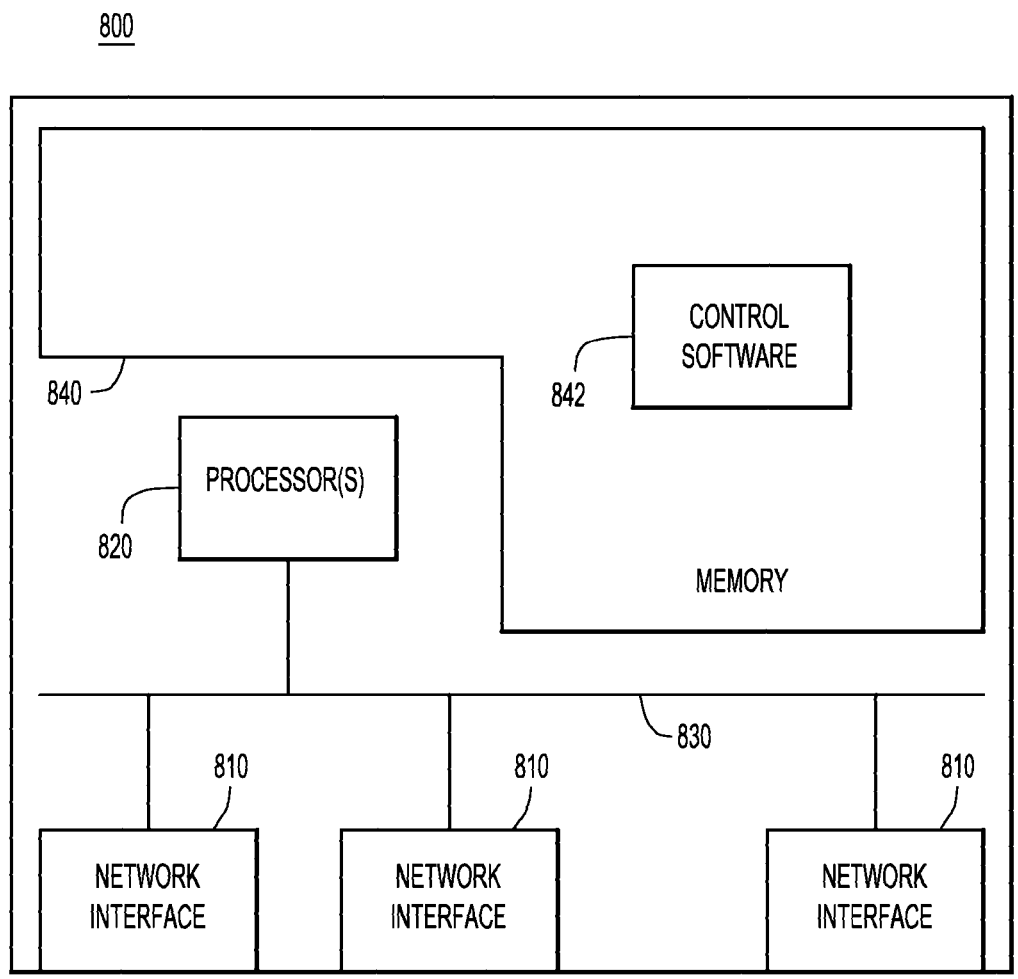
FIG. 8 is a block diagram of a device configured to provide internet protocol-based telephony with variable-length carrier systems, according to an example embodiment.

With reference now made to FIG. 8, an example block diagram is shown of a device 800, and device 800 may be any one of an initiating device, a called device, an SMS device, a CMS device, an SBC device, or a data store device, as described above with reference to FIGS. 1-7B. Accordingly, device 800 is configured to perform the techniques described herein. Device 800 includes network interfaces (including e.g., network ports) 810 which may be used to receive and send packets over a network. Accordingly, network interfaces 810 may be embodied as a wired interface, a wireless interfaces, optical interface, an electrical interface, or a combination thereof. One or more processors 820 are provided to coordinate and control device 800. The processor 820 is, for example, one or more microprocessors or microcontrollers, and it communicates with the network interfaces 810 via bus 830. Memory 840 stores software instructions 842 which may be executed by the processor 820. For example, control software 842 for device 800 includes instructions for performing call functions described above with reference to FIGS. 1-7B. In other words, memory 840 includes instructions for device 800 to carry out the operations described above in connection with FIGS. 1-7B.

Memory 840 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 840 may be or include one or more tangible (non-transitory) computer readable storage media (e.g., a memory device) encoded with software comprising computer executable instructions. When the instructions of the control software 842 is executed (by the processor 820), the processor is operable to perform the operations described herein in connection with FIGS. 1-7B.

In summary, described herein are methods by which first call identification information is stored at a network-connected device. The first call identification information identifies a call between an initiating device connected to an Internet Protocol (IP)-based network and a called device connected to the IP-based network. The call identified by the first call identification information is established through a telephone carrier network. Second call identification information is stored in the network-connected device. A determination is made that the first call identification information and the second call identification information identify the call from the initiating device to the called device. The call is connected through the IP-based network so as to avoid the telephone carrier network based upon the determining that the first call identification information and the second call identification information identify the call.

Also described herein are apparatuses, including a processor, in which the processor is configured to store first call identification information in a memory. The first call identification information identifies a call between an initiating device connected to an Internet Protocol (IP)-based network and a called device connected to the IP-based network. The call identified by the first call identification information is established through a telephone carrier network. The processor stores second call identification information in the memory. The processor determines that the first call identification information and the second call identification information identify the call from the initiating device to the called device. The processor connects the call through the IP-based network so as to avoid the telephone carrier network based upon the determination that the first call identification information and the second call identification information identify the call.

Additionally, described herein are one or more tangible, non-transitory computer readable storage media encoded with software comprising computer executable instructions. The software, when executed, is configured to store first call identification information in a memory. The first call identification information identifies a call between an initiating device connected to an Internet Protocol (IP)-based network and a called device connected to the IP-based network. The call identified by the first call identification information is established through a telephone carrier network. The software, when executed, is also configured to store second call identification information in the memory. The software further includes instructions operable to determine that the first call identification information and the second call identification information identify the call from the initiating device to the called device. The instructions are also operable to connect the call through the IP-based network so as to avoid the telephone carrier network based upon the determination that the first call identification information and the second call identification information identify the call.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
storing, at a network-connected device connected to an Internet Protocol (IP)-based network, first call identification information identifying an established call between an initiating device connected to the IP-based network and a called device connected to the IP-based network, wherein the call is established through a variable length numbering plan telephone carrier network, and wherein the first call identification information is received at the network connected device from a device associated with the initiating device;
storing, at the network-connected device, second call identification information for the established call received at the network-connected device from a device associated with the called device;
determining that the first call identification information and the second call identification information identify the call from the initiating device to the called device and that the established call hairpins from the IP-based network though the variable length numbering plan carrier network and back to the IP-based network; and
connecting the call via a path that remains within through the IP-based network so as to avoid the variable length numbering plan telephone carrier network based on the determining.

2. The method of claim 1, further comprising providing IP-based services to the call in response to connecting the call through the IP-based network so as to avoid the variable length numbering plan telephone carrier network.

3. The method of claim 1, wherein determining that the first call identification information and the second call identification information identify the call from the initiating device to the called device comprises determining that the first call identification information includes a first session identifier (ID) in the first call identification information that matches a second session ID in the second call identification information.

4. The method of claim 1, wherein storing the first call identification information comprises storing the first call identification information in a distributed key store; and wherein storing the second call identification information comprises storing the second call identification information in the distributed key store.

5. The method of claim 1, wherein storing the first call identification information comprises storing the first call identification information in a relational database; and
wherein storing the second call identification information comprises storing the second call identification information in the relational database.

6. The method of claim 1, wherein connecting comprises sending an invite message from a first call agent within the IP-based network to a second call agent within the IP-based network to establish the call between the first call agent and the second call agent.

7. The method of claim 6, further comprising establishing the call between the first call agent and the second call agent via a network path between the first call agent and the second call agent that does not exit the IP-based network.

8. The method of claim 1, wherein the IP-based network comprises a cloud-based network.

9. An apparatus comprising:
a memory,
a network interface configured to be connected to an Internet Protocol (IP)-based network, and
a processor, wherein the processor is configured to:
store, in the memory, first call identification information, received via the network interface, identifying an established call between an initiating device connected to the IP-based network and a called device connected to the IP-based network, wherein the call is established through a variable length numbering plan telephone carrier network, and wherein the first call identification information is received at the apparatus from a device associated with the initiating device;
store, in the memory, second call identification information for the established call received via the network interface from a device associated with the called device;
determine that the first call identification information and the second call identification information identify the call from the initiating device to the called device and that the established call hairpins from the IP-based network though the variable length numbering plan carrier network and back to the IP-based network; and
connect the call via a path that remains within the IP-based network so as to avoid the variable length numbering plan telephone carrier network based on the determination that the first call identification information and the second call identification information identify the call from the initiating device to the called device.

10. The apparatus of claim 9, wherein the IP-based network comprises a cloud-based network.

11. The apparatus of claim 9, wherein the processor is further configured to provide IP-based services to the call in response to connecting the call through the IP-based network so as to avoid the variable length numbering plan telephone carrier network.

12. The apparatus of claim 9, wherein the processor is configured to determine that the first call identification information and the second call identification information identify the call from the initiating device to the called device by determining that the first call identification information comprises a first session identifier (ID) in the first call identification information that matches a second session ID in the second call identification information.

13. One or more tangible non-transitory computer readable storage media encoded with software comprising computer executable instructions and when the software is executed operable to:
- store, in a memory, first call identification information, received via a network interface connected to an Internet Protocol (IP)-based network, identifying a call between an initiating device connected to the IP-based network and a called device connected to the IP-based network, wherein the call is established through a variable length numbering plan telephone carrier network, and wherein the first call identification information is received from a device associated with the initiating device;
- store, in the memory, second call identification information for the established call received via the network interface from a device associated with the called device;
- determine that the first call identification information and the second call identification information identify the call from the initiating device to the called device and that the established call hairpins from the IP based network though the variable length numbering plan carrier network and back to the IP based network; and
- connect the call via a path that remains within the IP-based network so as to avoid the variable length numbering plan telephone carrier network based on the determination that the first call identification information and the second call identification information identify the call from the initiating device to the called device.

14. The computer readable storage media of claim 13, wherein the IP-based network comprises a cloud-based network.

15. The computer readable storage media of claim 13, further comprising instructions operable to provide IP-based services to the call in response to connecting the call through the IP-based network so as to avoid the telephone carrier network.

16. The computer readable storage media of claim 13, further comprising instructions operable to determine that the first call identification information and the second call identification information identify the call from the initiating device to the called device by determining that the first call identification information comprises a first session identifier (ID) in the first call identification information that matches a second session ID in the second call identification information.

17. The method of claim 1, wherein the device associated with the initiating device comprises a first session management system device, and the device associated with the called device comprises a second session management system device.

18. The method of claim 1, wherein the device associated with the initiating device comprises a first session border controller device, and the device associated with the called device comprises a second session border controller device.

19. The method of claim 1, wherein the device associated with the initiating device comprises a first call management system device, and the device associated with the called device comprises a second call management system device.

* * * * *

UNITED STATES PATENT AND TRADEMARK OFFICE
CERTIFICATE OF CORRECTION

PATENT NO. : 9,942,390 B2
APPLICATION NO. : 14/949283
DATED : April 10, 2018
INVENTOR(S) : Christopher Pearce et al.

Page 1 of 1

It is certified that error appears in the above-identified patent and that said Letters Patent is hereby corrected as shown below:

In the Claims

Claim 1, Column 9, Line 49, please remove "through"

Signed and Sealed this
Eighth Day of January, 2019

Andrei Iancu
*Director of the United States Patent and Trademark Office*